March 27, 1956 G. B. PEET 2,739,376
METHOD OF MAKING DRAFT GEAR HOUSING
Filed June 14, 1952 2 Sheets-Sheet 1

INVENTOR.
George B. Peet
BY
Andrus & Scales
ATTORNEYS.

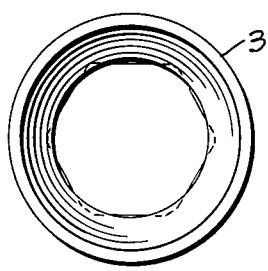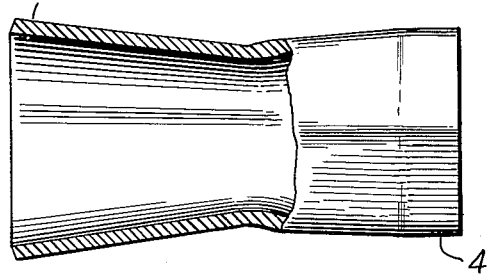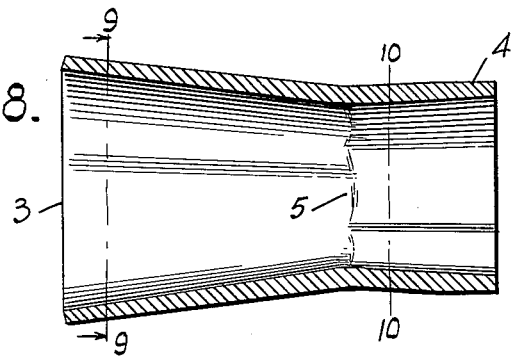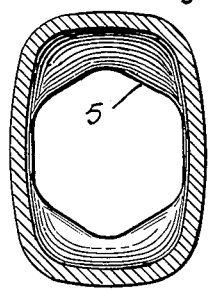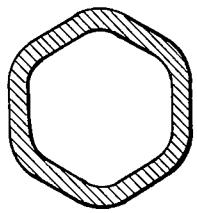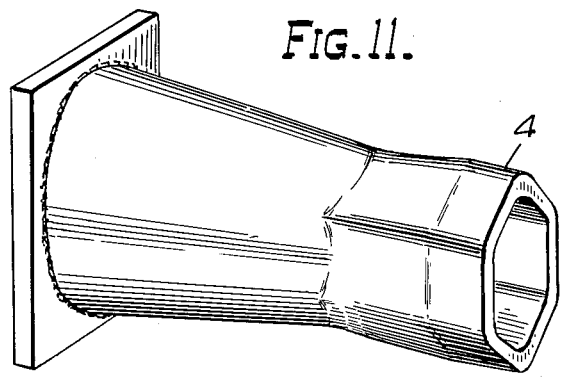

United States Patent Office 2,739,376
Patented Mar. 27, 1956

2,739,376
METHOD OF MAKING DRAFT GEAR HOUSING

George B. Peet, Milwaukee, Wis., assignor to A. O. Smith Corporation, Milwaukee, Wis., a corporation of New York Application June 14, 1952, Serial No. 293,689
4 Claims. (Cl. 29—542)

This invention relates to an improved draft gear housing and particularly to the method of fabricating the same.

Draft gear housings are disposed in the under carriages of railway freight cars for the purpose of absorbing shock incident to operation of the cars and consequently must be able to withstand very substantial pressures.

One object of the invention is to provide a method of producing a fabricated draft gear housing in which a particular portion of the housing disposed intermediate the ends of the housing is subjected to a working operation whereby the strength of the metal of the portion is greatly increased.

Another object is to provide a method of producing a fabricated draft gear housing for use with railway cars in which the ends of the housing are of different shapes, and in which the inner surface of the intermediate portion of the housing is blended into the oppositely disposed and shaped housing end portions in one operation.

A further object is to provide a method of producing a fabricated draft gear housing which is easier than practices heretofore followed and less expensive.

These and other objects will appear from the following description when read in conjunction with the drawing, in which:

Fig. 6 is a view similar to Fig. 5 after a second flaring operation;

Fig. 7 is an end view looking from the left of Fig. 6;

Fig. 8 is a longitudinal sectional view after a third or final flaring step;

Fig. 9 is a sectional view taken on line 9—9 of Fig. 8;

Fig. 10 is a sectional view taken on line 10—10 of Fig. 8; and

Fig. 11 is a perspective view of a fabricated draft gear housing produced by the method of the invention and with base plate attached.

Briefly the invention provides a method of producing a fabricated draft gear housing from a cylindrical blank in which one end of the blank is subjected to a plurality of upsetting and forming operations to shorten one end of the blank, thicken the walls thereof, and to provide the same with a polygonal shape. The opposite end of the blank is subsequently subjected to a plurality of flaring operations to reduce the thickness of the walls, to provide it with a desired shape which is different than the shape of the first end, and to substantially cold work an intermediate or throat portion of the blank by the last flaring operation to remove any sharp corners which might be present on the inner surface between the junction point of the differently shaped end portions of the housing.

Figure 1:
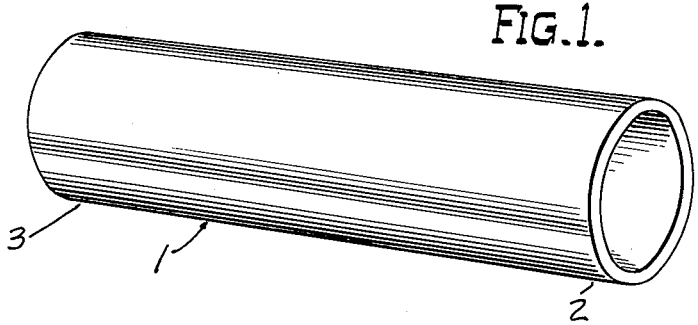
Figure 1 is a perspective view of a tube from which the fabrication of the draft gear housing is begun.

With reference to Fig. 1, cylindrical blank 1 of any desired length, diameter, and of uniform wall thickness throughout its length, is placed in an induction heater and permitted to remain there for a specified period of time so that substantially one-half the length of the blank is heated to a temperature suitable for an upset operation while the other half remains cold.

Figure 2:
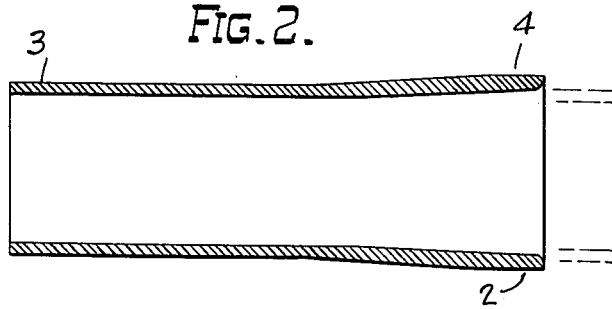
Fig. 2 is a longitudinal sectional view of the blank shown in Fig. 1 after a first upsetting operation.

The blank is then placed in a press, not shown, and a punch, not shown, is forced into the heated end 2 of the blank while the outside of the heated end is disposed in a die, not shown, of suitable configuration. The metal of the heated end is expanded by the punch until it conforms to the shape of the die and is also caused to flow or move toward the opposite or cold end 3 of the blank thereby thickening the walls of the heated end while simultaneously shortening the length of the same as can be seen in Fig. 2. During this first step the extreme right hand end of the blank is provided on its outer circumference with a cylindrical shape 4 longitudinally for a certain distance and this straight longitudinal portion is maintained throughout the combined operations and into the finished housing. The inner wall of the heated end is tapered inwardly from the outer end of the heated portion to adjacent the middle portion of the blank while the outer wall is tapered inwardly from the inner end of the flat surface 4 to a point beyond that of the inner tapered surface just described.

Figure 3:
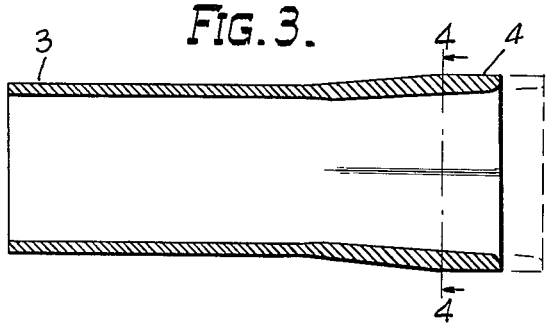
Fig. 3 is a longitudinal sectional view after a second upsetting operation.
Figure 4:
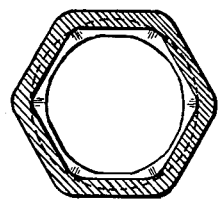
Fig. 4 is a view taken on line 4—4 of Fig. 3.

The next step in the method is a repetition of the first operation except that a tapering hexagonally-shaped punch and die are utilized to form the heated end of the blank into a hexagonal shape, to thicken the walls of the end being worked, and to cause additional heated metal to flow toward the opposite or cold end of the blank thereby further shortening the overall length of the same. See Figs. 3 and 4. The inner end of the now tapering hexagonally-shaped heated end portion joins the cold cylindrical end portion in a fairly defined line of demarcation. In other words, at this point of the method the inner surface of the blank is not merged between the end portions of the blank as in the finished product, the present upset step of the method causing rather sharp corners to appear.

Figure 5:
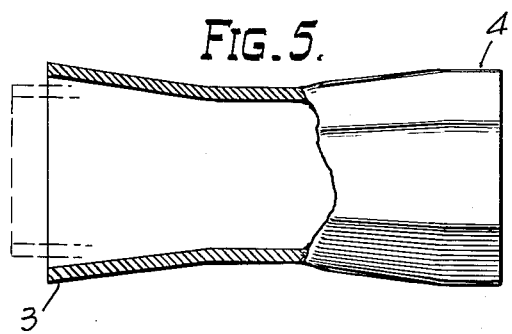
Fig. 5 is a longitudinal view partly in section, after a first flaring operation, on the opposite end of the tube from the first upset.

The heretofore unworked or cold end of the blank 3 is next placed in an induction furnace and heated for a predetermined length of time at a suitable temperature and then placed in a suitable gas furnace for soaking purposes. The blank is then placed in a press and a punch is driven into end 3 without confining the outside of the blank in a die as was done in the upsetting operations heretofore described. The punch utilized in this operation is of a shape to cause end 3 to flare outwardly while at the same time causing some of the heated metal to flow toward the opposite or hex-shaped end of the blank, thereby shortening the overall length of the blank, see Fig. 5. In flaring this end of the blank the wall at the flared end is slightly reduced while the wall adjacent the center is slightly thickened.

The flared end of the blank is next again placed into a gas furnace for a predetermined length of time and temperature to soak the same. However, during this heating a greater portion of the blank is placed in the furnace than in the immediately previous heating because right after this heating the flaring punch is again forced into the blank to a greater depth than in the next last flaring operation. The movement of the heated metal is much like that in the two former flaring operations in that the heated metal is moved toward the hex-shaped end of the blank and in reality there results a rather sharply defined line of demarcation, on the inner surface, between the inner end of the flared portion and the inner end of the hex-shaped portion at throat 5 of the housing.

It is highly desirable that the inner surface of throat 5 between the two oppositely shaped end portions of the housing be merged or be provided with a surface in which there are no sharp corners and in which the oppositely shaped ends are blended into one another. Ordinarily this would be accomplished by forcing a properly shaped tool into the blank from the end of the blank which is formed first and before this could be done it would necessitate heating this end of the blank.

The present invention provides a method for accomplishing the above by entering the blank from the flared end thereby obviating a further heating step while at the same time forming the flared end of the blank to its final shape.

With reference to Figs. 8 and 9 it will be noted that the shape of the left end of the housing is elliptical while adjacent the transverse center line the shape of the housing is hexagonal. A punch, not shown, which varies in shape from elliptical at one end to hexagonal at its opposite end is forced into the flared housing with the hex-shaped end toward the throat or center of the housing. The housing is unconfined about its outer surface during this operation and due to the heat retained in the metal from the previous heating, conforms itself to the shape of the punch.

The inner end of the punch is of hexagonal shape and when forced into the housing to its innermost position, extends across the throat of the housing between the oppositely shaped end portions of the housing. The metal of this particular region has purposely not been heated so that in effect, when the punch enters this region, the metal is subjected to a semi-cold working. Any sharp corners which might be present are smoothed out so that there results a gradual blending of the metal of the housing from a tapered elliptical shape at one end to a tapered hexagonal shape at the opposite end. By subjecting this particular portion of the housing to a semi-cold working the strength of the metal is substantially increased. This results in a substantial benefit because it is known that it is in this central region where most failures have heretofore occurred.

Various embodiments of the invention may be employed within the scope of the following claims. I claim:

1. The method of fabricating a draft gear housing from a hollow cylindrical blank for use in connection with railway cars in which the housing is provided with end portions of diverse shape, which comprises heating one end portion of a hollow cylindrical blank while permitting the opposite end thereof to remain cold, upsetting the heated end portion to shorten the length thereof while simultaneously thickening the walls, disposing said upset end portion in a die of suitable shape and forcing a punch of similar shape into said end portion to provide the same with a predetermined non-circular cross-sectional shape for a substantial distance longitudinally of the blank, heating the opposite end portion of said blank while permitting the said first end to remain cold, subjecting the second said end portion of the blank to a plurality of forming operations to flare the same, shorten the length thereof, and reduce the wall thickness of the flared end portion, and in the final forming operation cold working the mid-portion of the blank in the area of the junction between the flared end and the upset end portion to merge the cross sectional shapes of the respective ends by forcing into the flared end of the blank a punch having the leading end thereof of a cross sectional shape similar to the upset end portion of the blank and the trailing end thereof of a cross sectional shape similar to the flared end of the blank.

2. The method of fabricating a draft gear housing from a hollow cylindrical blank for use in connection with railway cars in which the housing is provided with one end of polygonal shape and the opposite end of elliptical shape which comprises heating one end portion of a hollow cylindrical blank while permitting the opposite end thereof to remain cold, upsetting the heated end portion to shorten the length thereof while simultaneously thickening the walls, disposing said upset end portion in a die of polygonal shape and forcing a punch of similar shape into said end portion to provide the end portion with a polygonal cross sectional shape for a substantial distance longitudinally of the blank, heating the opposite end portion of said blank while permitting the polygonal shaped end to remain cold, subjecting the second said end portion of the blank to a plurality of forming operations to flare the same, shorten the length thereof, and reduce the wall thickness of the flared end, and in the final forming operation cold working the mid-portion of the blank in the area of the junction between the flared end and the polygonal end to merge the cross sectional shapes of the respective ends by forcing into the flared end of the blank a punch having the leading end thereof of a cross sectional shape similar to the polygonal end of the blank and the trailing end thereof of a cross sectional shape similar to the flared end of the blank, the longitudinal travel of the last recited punch being sufficient to pass across the inner border of the polygonal shaped end portion of the blank.

3. The method of fabricating a draft gear housing from a hollow cylindrical blank for use in connection with railway cars in which the housing is provided with one end of polygonal shape, the opposite end of elliptical shape, and an intermediate throat portion of less cross-sectional area than either end portion, which comprises heating one end portion of a hollow cylindrical blank while permitting the opposite end portion to remain cold, upsetting the heated end portion to shorten the length thereof while simultaneously thickening the walls, disposing said upset end portion in a confining die of polygonal shape and forcing a punch of similar shape into said end portion to provide the end portion with a polygonal cross sectional shape for a substantial distance longitudinally of the blank and to cause a portion of the heated metal to flow toward the throat portion of the blank, heating the opposite end portion of said blank while permitting the polygonal shaped end to remain cold, subjecting the second said end portion of the blank to a plurality of forming operations to flare the same, shorten the length thereof and reduce the wall thickness of the flared end, and in the final forming operation merging the cross sectional shape of the flared end with the polygonal cross sectional shape of the upset end at the throat of the blank while simultaneously cold working the throat by forcing into the flared end of the blank a punch having the leading end thereof of a polygonal cross sectional shape and the trailing end thereof of elliptical shape.

4. In the method of fabricating a draft gear housing from a generally cylindrical metal blank provided at one end with an upset end portion of non-circular cross sectional shape, the steps of operating on the other end portion of the blank to flare the same, and then cold working the mid-portion of the blank in the area of the junction between the flared end and the upset end portion by forcing into the flared end of the blank a punch having the leading end thereof complementary of the non-circular cross-sectional shape of the blank and the trailing end thereof complementary of the flared end of the blank to eliminate sharp edges at the junction of the respective blank ends and increase the strength of the metal in the mid-portion of the blank.

References Cited in the file of this patent

UNITED STATES PATENTS

| 1,104,088 | Wales | July 21, 1914 |
| 1,245,596 | Kirk | Nov. 6, 1917 |
| 1,902,222 | Eksergian | Mar. 21, 1933 |
| 2,078,195 | Cornell, Jr. | Apr. 20, 1937 |
| 2,112,231 | Speidel | Mar. 29, 1938 |
| 2,162,510 | Matthaei | June 13, 1939 |
| 2,355,792 | Franck | Aug. 15, 1944 |
| 2,368,695 | Wilber | Feb. 6, 1945 |
| 2,406,059 | Burch | Aug. 20, 1946 |